United States Patent
Patel

(10) Patent No.: US 6,762,573 B2
(45) Date of Patent: Jul. 13, 2004

(54) SYSTEM AND METHOD FOR ESTIMATING ROTOR POSITION OF A PERMANENT MAGNET MOTOR

(75) Inventor: Nitinkumar Ratilal Patel, Buena Park, CA (US)

(73) Assignee: General Motors Corporation, Detroit, MI (US)

(*) Notice: Subject to any disclaimer, the term of this patent is extended or adjusted under 35 U.S.C. 154(b) by 60 days.

(21) Appl. No.: 10/085,595

(22) Filed: Feb. 26, 2002

(65) Prior Publication Data

US 2003/0160583 A1 Aug. 28, 2003

(51) Int. Cl.[7] .............................. H02P 1/18; H02P 3/08; H02P 5/08
(52) U.S. Cl. ........................ 318/254; 318/430; 318/432; 318/434; 318/700; 318/727; 318/138
(58) Field of Search ................................ 318/138, 254, 318/439, 430–434, 700, 727

(56) References Cited

U.S. PATENT DOCUMENTS

| | | | | |
|---|---|---|---|---|
| 5,140,245 A | * | 8/1992 | Stacey ........................ 318/723 |
| 5,565,752 A | * | 10/1996 | Jansen et al. ................ 318/807 |
| 6,081,093 A | * | 6/2000 | Oguro et al. ................ 318/807 |
| 6,163,127 A | | 12/2000 | Patel et al. .................. 318/700 |
| 6,223,114 B1 | | 4/2001 | Boros et al. .................. 701/70 |
| 6,304,052 B1 | * | 10/2001 | O'Meara et al. ............. 318/700 |
| 6,339,308 B2 | * | 1/2002 | Shinnaka ...................... 318/701 |
| 6,396,229 B1 | * | 5/2002 | Sakamoto et al. ........... 318/439 |
| 6,462,491 B1 | * | 10/2002 | Iijima et al. ................. 318/254 |
| 6,525,504 B1 | * | 2/2003 | Nygren et al. ............... 318/700 |

FOREIGN PATENT DOCUMENTS

JP   2003-259683   *   9/2003   ............ H02P/6/18

* cited by examiner

Primary Examiner—Robert Nappi
Assistant Examiner—Tyrone Smith
(74) Attorney, Agent, or Firm—Christopher DeVries

(57) ABSTRACT

A rotor position estimator for a permanent magnet motor with a stator and a rotor includes a sensing circuit that generates d-axis and q-axis negative sequence stationary current (NSSC) signals. A signal conditioning circuit combines the d-axis and q-axis NSSC signals with first and second positive feedback signals that are based on a rotor position estimate signal. A regulator is coupled to an output of the signal conditioning circuit. A mechanical system simulator that is coupled to the regulator and a demand torque signal generates the rotor position estimate signal. The signal conditioning circuit includes a second harmonic amplifying circuit that receives the rotor position estimate signal and outputs the first feedback signal to a first multiplier. The signal conditioning circuit includes an inverse saliency model receives the rotor position estimate signal and outputs the second feedback signal to a second multiplier.

24 Claims, 4 Drawing Sheets

SYSTEM AND METHOD FOR ESTIMATING ROTOR POSITION OF A PERMANENT MAGNET MOTOR

TECHNICAL FIELD

The present invention relates to permanent magnet motors, and more particularly to sensorless rotor position estimators for permanent magnet motors.

BACKGROUND OF THE INVENTION

Interest in electric and hybrid electric vehicles (EV and HEV) is increasing due to more stringent emissions standards. EV and HEV vehicles require a highly efficient, reliable and safe electric drivetrain to compete with vehicles with internal combustion (IC) engines. Using efficient motor drives and advanced control methods such as sensorless techniques for deriving rotor position reduces the weight and cost of the electric drivetrain and improves the operating efficiency of the EV and HEV vehicles.

Interior permanent magnet (IPM) motor drives have natural saliency, which refers to the variation in stator leakage inductance with respect to rotor position. Saliency-based sensing systems derive the position of the rotor without rotor position transducers, hall effect sensors, or other physical sensors. In other words, the motor acts as an electromagnetic resolver. A power converter applies a carrier frequency voltage to a stator winding of the motor. The stator winding produces high frequency currents that vary with rotor position. The current variations are sensed by a current sensor.

Referring now to FIG. 1, a negative sequence component (NSC) of stator current signal is shown at 10. The NSC of the stator current signal 10 is processed to generate a rotor position signal that is labeled 12 in FIG. 1. The NSC current variations have a relatively small amplitude (e.g., 3 Amps) as compared with fundamental stator currents (e.g., 300 Amps). Transients in the stator current create harmonics over the entire frequency spectrum, including a near negative sequence carrier signal frequency. A Fast Fourier Transform (FFT) 14 of the NSC of stator current illustrates the harmonic content. The harmonics prevent accurate measurement of the negative sequence carrier signal current. In other words, conventional sensorless rotor position estimators tend to temporarily generate inaccurate rotor position estimates. Because the near negative sequence carrier signal frequency contains the desired saliency spatial information, it is difficult or impossible to accurately determine the position of the rotor.

As was previously mentioned, the NSC of the stator current is very small as compared with the fundamental stator current. It is very difficult to accurately measure the small amplitude signals using a sensor that is rated for much higher current levels. Injecting higher amplitude currents onto the stator coils would possibly improve accuracy. Using a current sensor with lower current ratings would also improve accuracy. Both options are not viable for drive applications. Injecting higher current onto the stator coil increases losses in the drive system. Using a current sensor with a lower current rating as compared with the rated current limits the torque generating capability of the drive system.

SUMMARY OF THE INVENTION

A rotor position estimator according to the present invention estimates rotor position for a permanent magnet motor that includes a stator and a rotor. A sensing circuit generates d-axis and q-axis negative sequence stationary current (NSSC) signals. A signal conditioning circuit combines the d-axis and q-axis NSSC signals with a first positive feedback signal that is based on a rotor position estimate signal to generate modified d-axis and q-axis NSSC signals. A regulator is coupled to an output of the signal conditioning circuit. A mechanical system simulator is coupled to an output of the regulator and generates the rotor position estimate signal.

In other features of the invention, the signal conditioning circuit combines the modified d-axis and q-axis NSSC signals with a second positive feedback signal that is based on a rotor position estimate signal. The mechanical system simulator receives a demand torque signal.

In still other features, the signal conditioning circuit includes a first multiplier having first inputs that receive the d-axis and q-axis NSSC signals. The signal conditioning circuit includes a second harmonic amplifying circuit having an input that receives the rotor position estimate signal and an output that produces the first feedback signal to a second input of the first multiplier. The first multiplier multiples the first feedback signal and the d-axis NSSC signal to generate the modified d-axis NSSC signal. The first multiplier also multiples the first feedback signal and the q-axis NSSC signal to generate the modified q-axis NSSC signal.

In yet other features, the signal conditioning circuit includes a second multiplier having first inputs that receive the modified d-axis and q-axis NSSC signals from the first multiplier and an output that is coupled to the regulator. The signal conditioning circuit includes an inverse saliency model that has an input that receives the rotor position estimate signal and that generates the second feedback signal that is output to a second input of the second multiplier. The regulator is preferably selected from the group of proportional (P), proportional integral (PI), proportional integral differential (PID), and limited PI regulators.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENTS

The following description of the preferred embodiment(s) is merely exemplary in nature and is in no way intended to limit the invention, its application, or uses.

Figure 1:
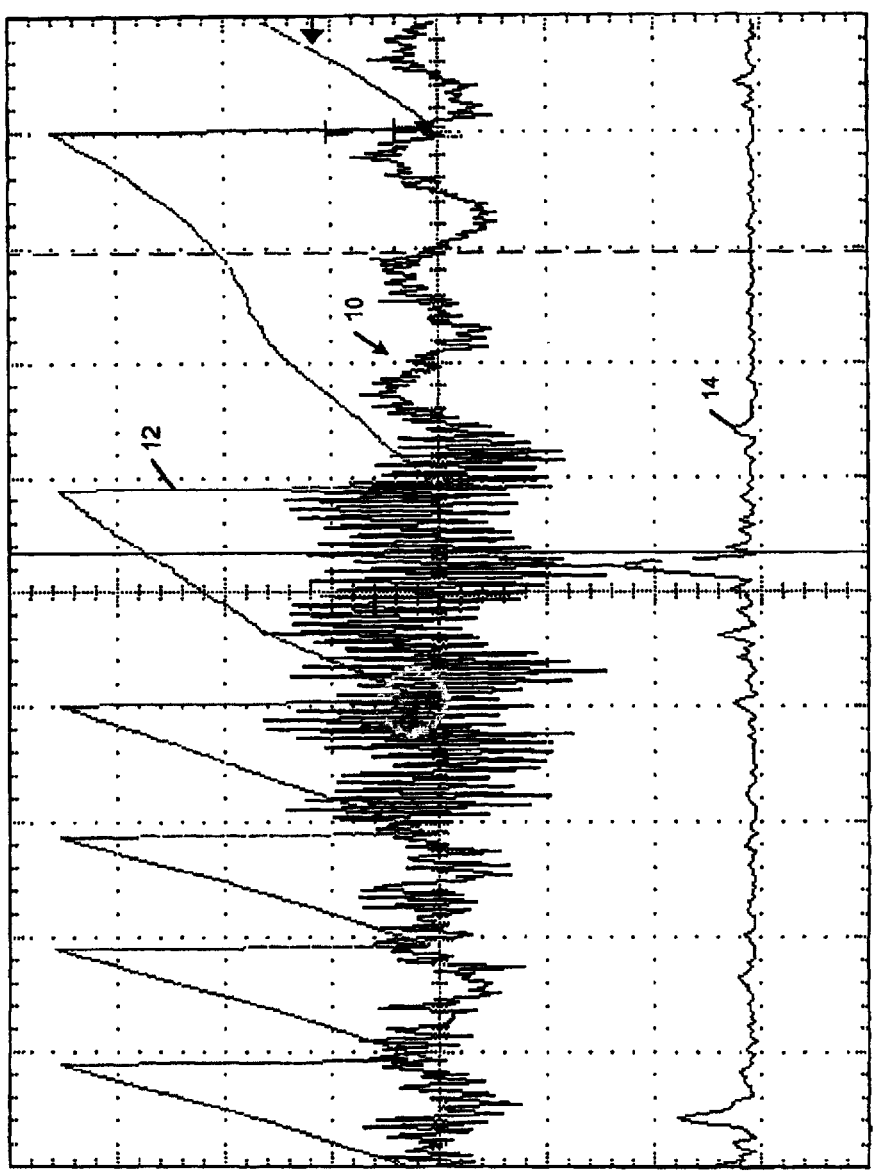
FIG. 1 illustrates a NSC of a stator current signal, a rotor position signal, and a fast Fourier transform of the NSC of the stator current signal.
Figure 2:
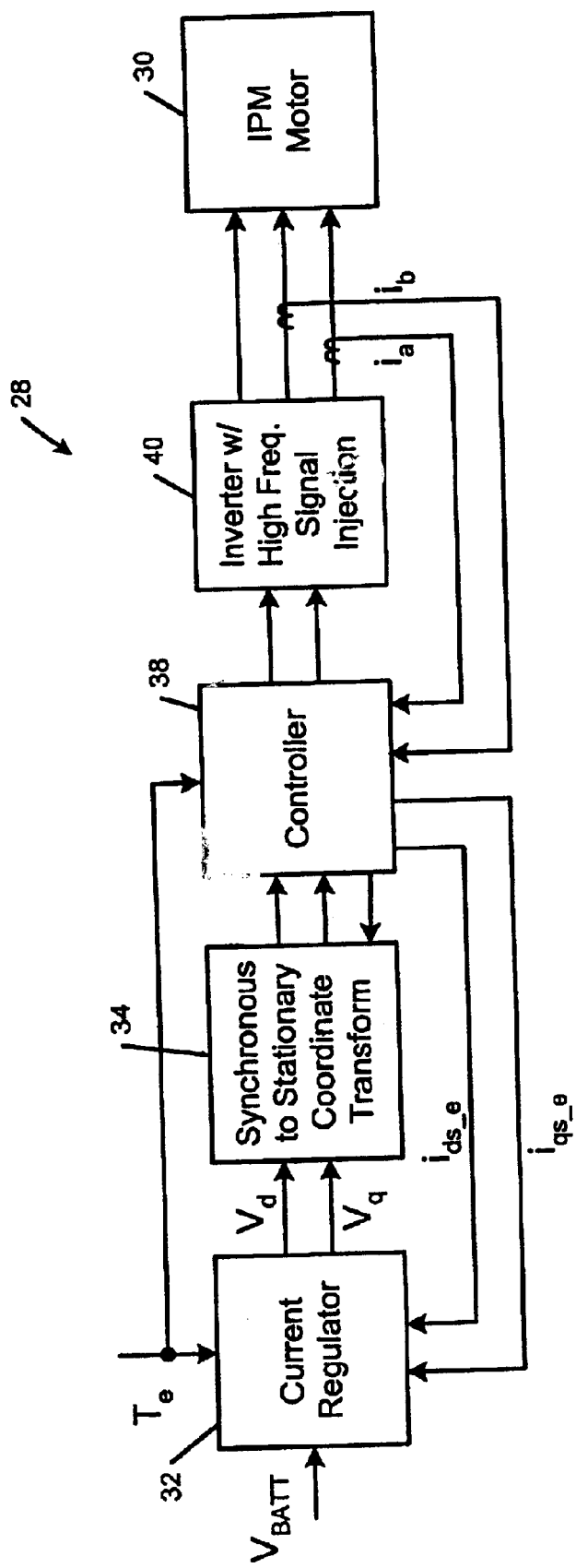
FIG. 2 is a simplified functional block diagram of a control system for a permanent magnet motor.

Referring now to FIG. 2, a control system 28 for a permanent magnet motor 30 is illustrated. The control system 28 includes a current regulator 32 that receives battery voltage $V_{BATT}$, command torque $T_e$ as inputs, and d-q axis feedback currents. The command torque $T_e$ is preferably related to the position of an accelerator pedal of an electric vehicle.

The current regulator 32 outputs d-axis and q-axis voltages ($V_d$ and $V_q$) to an input of a synchronous-to-stationary coordinate transform circuit 34. The synchronous-to-stationary coordinate transform circuit 34 also receives θ from a controller 38. Inputs of a controller 38 are connected to outputs of the synchronous-to-stationary coordinate transform circuit 34 and to the command torque $T_e$. An input of an inverter with high frequency signal injection 40 is connected to an output of the controller 38. Current signals $i_a$ and $i_b$ are sensed from input terminals of the IPM motor 30 and fed back to the controller 38. The conventional operation of the components 32, 34, 38 and 40 of the control system 28 are described further in U.S. Pat. No. 6,163,127 to Patel et al., which is hereby incorporated by reference.

Figure 3:
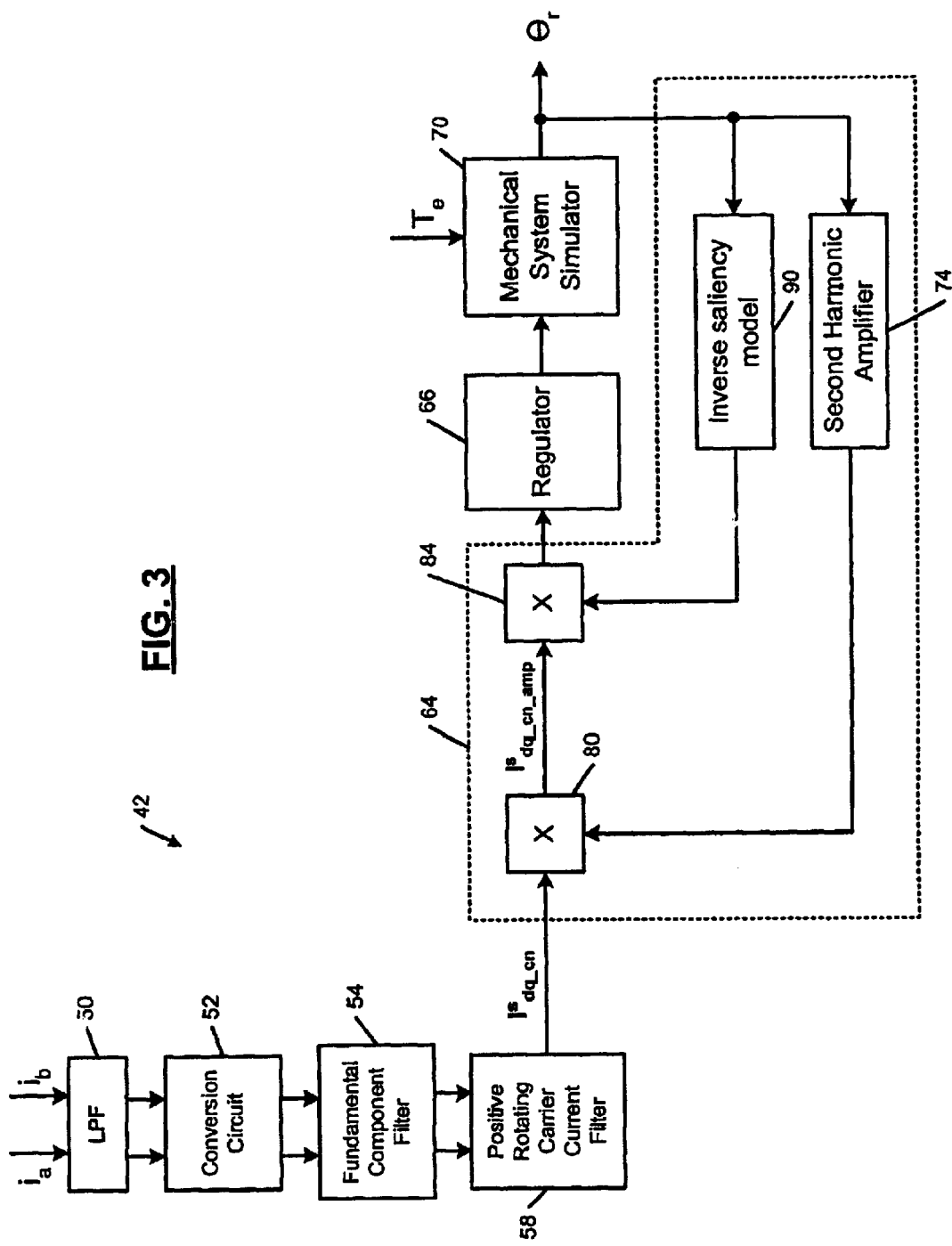
FIG. 3 illustrates a rotor position estimator that forms part of the controller of FIG. 2.

Referring now to FIG. 3, a rotor position estimator 42 according to the present invention forms part of the controller 38. The rotor position estimator 42 generates d-axis and q-axis negative sequence stationary current (NSSC) signals ($I_{dq\_cn}$) from current signals $i_a$ and $i_b$. The d-axis and q-axis NSSC signals contain rotor position information. Current signals $i_a$ and $i_b$ applied to a low pass filter 50. Outputs of the low pass filter 50 are processed by the conversion circuit 52 from three-phase to two-phase.

Outputs of the conversion circuit 52 are input to the fundamental component filter 54 that processes the current signals along with the rotor position angle signal to filter out the fundamental frequency of the rotor, for example using a notch filter. The fundamental component filter 54 converts the signals to stationary frame positive and negative rotating carrier current signals. The stationary frame positive and negative rotating carrier current signals along with the high frequency injection signal angular position signal are input to a positive rotating carrier current filter 58. The positive rotating carrier current filter 58 outputs d-axis and q-axis NSSC signals.

The d-axis and q-axis NSSC signals are input to a signal conditioning circuit 64. An output of the signal conditioning circuit 64 is input to a regulator 66. An output of the regulator 66 and the command torque $T_e$ are input to a mechanical system simulator 70. The mechanical system simulator 70 generates a rotor position estimate signal that is fed back to the signal conditioning circuit 64.

The signal conditioning circuit 64 generates first and second feedback signals that are based on the rotor position estimate that is generated by the mechanical system simulator 70. The first feedback signal is generated by a second harmonic amplifying circuit 74 that receives the rotor position estimate signal from the mechanical system simulator 70. The second harmonic amplifying circuit 74 amplifies the second harmonic, for example by generating a signal $I_{cn}*e^{jh\theta}$. An output of the second harmonic amplifying circuit 74 is input to a first multiplier 80 that also receives the d-axis and q-axis NSSC signals as inputs. The first multiplier 80 outputs modified (or amplified) d-axis and q-axis NSSC signals ($I^s_{dq\_cn\_amp}$) to a second multiplier 84.

The second feedback signal is generated by an inverse saliency model 90 that receives the rotor position estimate signal from the mechanical system simulator 70. The inverse saliency model 90 outputs the signal to the second multiplier 84 that also receives the modified d-axis and q-axis NSSC signals as inputs. An output of the second multiplier 84 is input to the regulator 66. The regulator 66 is preferably selected from the group of proportional (P), proportional integral (PI), proportional integral differential (PID), and limited PI regulators.

In use, the stator terminal currents are sensed and then transformed to equivalent two-phase currents in a stationary frame. The transformed signals are processed to filter out the fundamental and positive rotating carrier current components. This process generates the negative sequence stationary current components rotating in a negative reference frame, which contains rotor position information. The process to calculate the negative sequence carrier currents in the negative reference frame ($I^s_{dq\_cn}$) is described more fully in U.S. Pat. No. 6,163,127 to Patel et al.

As shown in FIG. 3, the mechanical system simulator 70 is used to estimate the rotor position from the negative rotating carrier current in the negative reference frame signal ($I^s_{dq\_cn}$). The signals are then amplified in a positive feedback manner using estimated rotor position from the mechanical system simulator 70. Only the second harmonic component of the current rotating in the negative reference frame is amplified. In the transient case when other harmonic currents are being produced, the amplitude of the saturation-induced harmonic (i.e., second) current is relatively large as compared with the other harmonics. The mechanical system simulator 70 tracks the phase angle of the saturation induced harmonic signal. Making the second harmonic a dominant part of the input signal with respect to other harmonics helps maintain tracking of that particular signal. The rotor position estimator can be implemented as discrete circuits, as an algorithm executed by a processor and memory, as an application specific integrated circuit, or in any other suitable manner.

Figure 4:
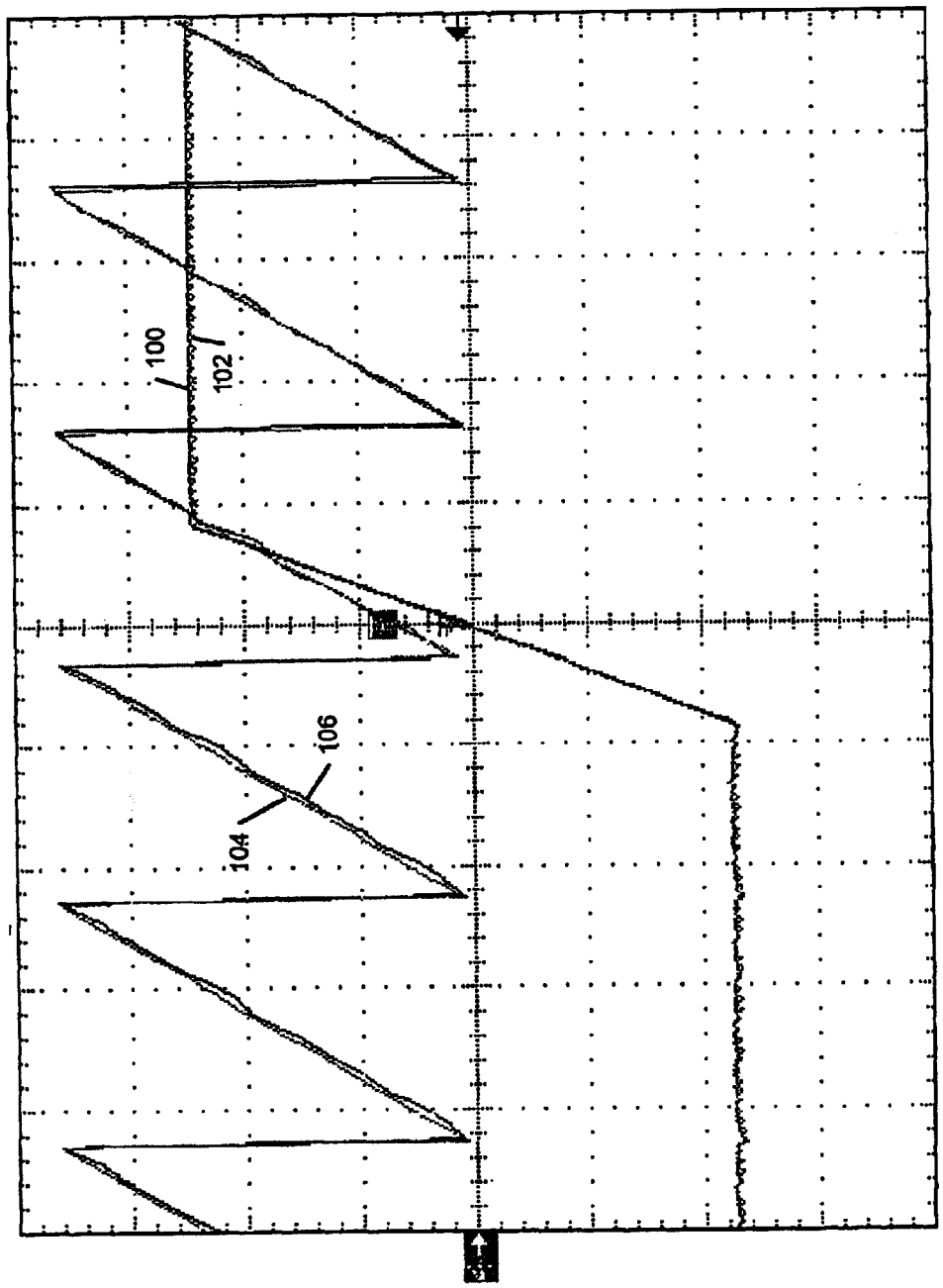
FIG. 4 illustrates command and feedback torque and estimated and actual rotor position for the control system of FIG. 2.

Referring now to FIG. 4, the transient performance (from −100% to +100% motor torque) of a 70 KW drive system using the rotor position estimator 42 is shown. Waveform 100 is the command torque $T_e$ and waveform 102 is the feedback torque. Waveform 104 is the estimated rotor position and waveform 106 is the actual rotor position. The rotor position estimator 42 provides a reliable rotor position estimate signal as compared with other conventional sensorless rotor position estimators.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A rotor position estimator for a permanent magnet motor that includes a stator and a rotor, comprising:

a sensing circuit that generates d-axis and q-axis negative sequence stationary current (NSSC) signals;

a signal conditioning circuit that combines said d-axis and q-axis NSSC signals with a first positive feedback signal that is based on a rotor position estimate signal to generate modified d-axis and q-axis NSSC signals;

a regulator coupled to an output of said signal conditioning circuit; and a mechanical system simulator that is coupled to an output of said regulator and that generates said rotor position estimate signal.

2. The rotor position estimator of claim 1 wherein said signal conditioning circuit combines said modified d-axis and q-axis NSSC signals with a second positive feedback signal that is based on a rotor position estimate signal.

3. The rotor position estimator of claim 2 wherein said mechanical system simulator receives a demand torque signal.

4. The rotor position estimator of claim 3 wherein said signal conditioning circuit includes a first multiplier having first inputs that receive said d-axis and q-axis NSSC signals.

5. The rotor position estimator of claim 4 wherein said signal conditioning circuit includes a second harmonic amplifying circuit having an input that receives said rotor position estimate signal and an output that produces said first feedback signal to a second input of said first multiplier.

6. The rotor position estimator of claim 5 wherein said first multiplier multiples said first feedback signal and said d-axis NSSC signal to generate said modified d-axis NSSC signal and multiples said first feedback signal and said q-axis NSSC signal to generate said modified q-axis NSSC signal.

7. The rotor position estimator of claim 6 wherein said signal conditioning circuit includes a second multiplier having first inputs that receive said modified d-axis and q-axis NSSC signals from said first multiplier and an output that is coupled to said regulator.

8. The rotor position estimator of claim 7 wherein said signal conditioning circuit includes an inverse saliency model that has an input that receives said rotor position estimate signal and that generates said second feedback signal that is output to a second input of said second multiplier.

9. The rotor position estimator of claim 1 wherein said regulator is selected from the group of proportional (P), proportional integral (PI), proportional integral differential (PID), and limited PI regulators.

10. A method for estimating rotor position for a permanent magnet motor that includes a stator and a rotor, comprising the steps of:

generating d-axis and q-axis negative sequence stationary current (NSSC) signals;

signal processing said d-axis and q-axis NSSC signals using a first positive feedback signal that is based on a rotor position estimate signal; and using a mechanical system simulator that receives an output of said signal processing step to generate said rotor position estimate signal.

11. The method of claim 10 further comprising the step of regulating said output of said signal processing step to produce a regulated signal before using said mechanical system simulator.

12. The method of claim 11 further comprising the step of combining said output of said signal processing step with a second positive feedback signal that is based on a rotor position estimate signal prior to said regulating step.

13. The method of claim 12 wherein said mechanical system simulator has a second input that receives a torque demand signal.

14. The method of claim 13 wherein said signal processing step includes multiplying said d-axis and q-axis NSSC signals by said first feedback signal that is output by a second harmonic amplifier to generate modified d-axis and q-axis NSSC signals.

15. The method of claim 14 wherein said a second harmonic amplifier has an input that receives said rotor position estimate signal.

16. The method of claim 15 further comprising the step of multiplying said modified d-axis and q-axis NSSC signals by said second feedback signal.

17. The method of claim 16 wherein said second feedback signal is generated by an inverse saliency model.

18. The method of claim 17 wherein said inverse saliency model has an input that receives said rotor position estimate signal.

19. A rotor position estimator for a permanent magnet motor that includes a stator and a rotor, comprising:

a sensing circuit that generates d-axis and q-axis negative sequence stationary current (NSSC) signals;

a signal conditioning circuit that combines said d-axis and q-axis NSSC signals with first and second positive feedback signals that are based on a rotor position estimate signal;

a regulator coupled to an output of said signal conditioning circuit; and a mechanical system simulator that has a first input coupled to an output of said regulator, that has a second input that receives a demand torque signal, and that generates said rotor position estimate signal.

20. The rotor position estimator of claim 19 wherein said signal conditioning circuit includes a first multiplier having first inputs that receive said d-axis and q-axis NSSC signals.

21. The rotor position estimator of claim 20 wherein said signal conditioning circuit includes a second harmonic amplifying circuit that receives said rotor position estimate signal and that outputs said first feedback signal to a second input of said first multiplier.

22. The rotor position estimator of claim 21 wherein said first multiplier outputs modified d-axis and q-axis NSSC signals.

23. The rotor position estimator of claim 22 wherein said signal conditioning circuit includes a second multiplier having first inputs that receive said modified d-axis and q-axis NSSC signals from said first multiplier.

24. The rotor position estimator of claim 23 wherein said signal conditioning circuit includes an inverse saliency model that receives said rotor position estimate signal and that outputs said second feedback signal to a second input of said second multiplier.

* * * * *